United States Patent
Kazmi et al.

(10) Patent No.: US 11,323,232 B2
(45) Date of Patent: May 3, 2022

(54) UE EMISSION CONTROL PARAMETER ADAPTION UNDER OVERLAPPING TTIS

(71) Applicant: Telefonaktiebolaget LM Ericsson (publ), Stockholm (SE)

(72) Inventors: Muhammad Kazmi, Sundbyberg (SE); Christian Bergljung, Lund (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/349,400

(22) PCT Filed: Nov. 14, 2017

(86) PCT No.: PCT/SE2017/051124
§ 371 (c)(1),
(2) Date: May 13, 2019

(87) PCT Pub. No.: WO2018/088953
PCT Pub. Date: May 17, 2018

(65) Prior Publication Data
US 2019/0372741 A1    Dec. 5, 2019

Related U.S. Application Data

(60) Provisional application No. 62/421,529, filed on Nov. 14, 2016.

(51) Int. Cl.
*H04L 5/00* (2006.01)
*H04W 52/36* (2009.01)
(Continued)

(52) U.S. Cl.
CPC .............. *H04L 5/0082* (2013.01); *H04W 4/70* (2018.02); *H04W 52/367* (2013.01); *H04W 72/0453* (2013.01)

(58) Field of Classification Search
CPC ... H04W 4/70; H04W 52/367; H04W 52/226; H04W 72/0453; H04L 5/0082
See application file for complete search history.

(56) References Cited

U.S. PATENT DOCUMENTS

| | | | |
|---|---|---|---|
| 2009/0135262 A1* | 5/2009 | Ogasawara | H04N 5/2354 348/211.4 |
| 2013/0214166 A1* | 8/2013 | Barlow | G01J 5/0025 250/342 |

(Continued)

FOREIGN PATENT DOCUMENTS

| CN | 102197689 A | 9/2011 |
|---|---|---|
| CN | 104081853 A | 10/2014 |

(Continued)

OTHER PUBLICATIONS

3GPP TSG RAN WG1 #83, R1-156822 (Year: 2015).*
(Continued)

*Primary Examiner* — Diane L Lo
*Assistant Examiner* — Abusayeed M Haque
(74) *Attorney, Agent, or Firm* — Murphy, Bilak & Homiller, PLLC

(57) ABSTRACT

This disclosure pertains to a method for operating a user equipment (10) in a radio access network, the method comprising transmitting signaling based on an emission control parameter, the emission control parameter being based on a TTI configuration and/or structure. There are also disclosed related devices and methods.

8 Claims, 7 Drawing Sheets

(51) Int. Cl.
  *H04W 4/70* (2018.01)
  *H04W 72/04* (2009.01)

(56) References Cited

U.S. PATENT DOCUMENTS

| | | | | |
|---|---|---|---|---|
| 2014/0044023 | A1* | 2/2014 | Kazmi | H04W 28/18 370/278 |
| 2016/0205631 | A1* | 7/2016 | Chen | H04W 52/146 455/522 |
| 2016/0305343 | A1* | 10/2016 | Morgan | F02C 9/28 |
| 2016/0323887 | A1 | 11/2016 | Patel et al. | |
| 2016/0330676 | A1* | 11/2016 | Thangarasa | H04W 76/14 |
| 2017/0230917 | A1* | 8/2017 | Ouchi | H04L 1/1812 |
| 2017/0303238 | A1* | 10/2017 | Fodor | H04W 64/00 |
| 2018/0077721 | A1* | 3/2018 | Nory | H04W 72/1263 |
| 2018/0242316 | A1* | 8/2018 | Takeda | H04L 5/001 |
| 2019/0207656 | A1* | 7/2019 | Hlander | H04L 5/0048 |
| 2020/0036629 | A1* | 1/2020 | Roeland | H04L 47/125 |

FOREIGN PATENT DOCUMENTS

| | | |
|---|---|---|
| CN | 104333899 A | 2/2015 |
| WO | 2016137816 A2 | 9/2016 |

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 14)", 3GPP TS 36.101 V14.1.0, Sep. 2016, 1-1187.

Unknown, Author, "Study on specification impact for uplink due to TTI shortening", 3GPP TSG RAN WG1 #83, R1-156822, Anaheim, USA, Nov. 15-22, 2015, 1-3.

* cited by examiner

UE EMISSION CONTROL PARAMETER ADAPTION UNDER OVERLAPPING TTIS

TECHNICAL FIELD

The present disclosure pertains to wireless communication technology, in particular Radio Access Technology, which may in particular be according to a standard like a 3GPP standard, e.g. LTE and/or NR (New Radio), and/or a 5G standard.

BACKGROUND

Modern wireless communication systems are developed to allow increasingly shorter transmission times, e.g. short TTIs (Transmission Time Interval), also in some cases referred to as mini-slots or non-slot based transmissions or short subframes or short slots. Such short TTIs are usually embedded in, and/or arranged relative to, a resource or timing grid defined based on a longer timing structure, e.g. a subframe or slot. A short TTI may be considered to define a timing interval, in particular for transmission, comprising a smaller number of symbol time intervals than the longer timing structure.

The use of short TTIs has consequences on the overall behaviour of a wireless network, in particular the use of resources and occurrence of interferences.

SUMMARY

This disclosure aims at providing approaches allowing improved handling of short transmissions, e.g. TTI, in particular for uplink or sidelink transmissions, e.g. by a user equipment or terminal. In particular, the approaches allow improved power control.

Accordingly, there is disclosed a method for operating a user equipment in a radio access network. The method comprises transmitting signaling based on an emission control parameter, the emission control parameter being based on a TTI configuration and/or structure.

Moreover, a user equipment for a radio access network is described, the user equipment being adapted for transmitting signaling based on an emission control parameter, the emission control parameter being based on a TTI configuration and/or structure.

A method for operating a network node in a radio access network may be considered. The method comprises receiving signaling from a user equipment based on an emission control parameter, the emission control parameter being based on a TTI configuration and/or TTI structure pertaining to the UE and/or terminal.

Also, a network node for a radio access network is discussed. The network node is adapted for receiving signaling from a user equipment based on an emission control parameter, the emission control parameter being based on a TTI configuration and/or TTI structure pertaining to the UE and/or terminal.

A program product comprising code executable by control circuitry is disclosed, the code causing the control circuitry to carry out and/or control any of the methods described herein.

Furthermore, a carrier medium arrangement carrying and/or storing a program product as described herein is considered.

The approaches discussed herein allow adaption of power control to TTI configuration, in particular accommodation to short TTIs. In particular, the impact of power requirements on system performance, e.g. in term of interference or limitation of power, may be optimized for short TTIs.

BRIEF DESCRIPTION OF THE DRAWINGS

The drawings are provided to illustrate concepts and approaches described herein, and are not intended to limit their scope. The drawings comprise.

DETAILED DESCRIPTION

The approaches in the following are illustrated in the context of LTE, but are applicable to other radio access technology as well, e.g. NR.

LTE uses OFDM in the downlink and DFT-spread OFDM (sometimes referred to as SC-FDMA, Single Carrier FDMA) in the uplink. In the time domain, LTE downlink transmissions are organized into radio frames of 10 ms, each radio frame consisting of ten equally-sized subframes of length $T_{subframe}=1$ ms.

Furthermore, the resource allocation in LTE is typically described in terms of resource blocks (RB), wherein a resource block corresponds to one slot (0.5 ms) in the time domain and 12 contiguous subcarriers in the frequency domain. A pair of two adjacent resource blocks in time direction (1.0 ms) is known as a resource block pair. This is also denoted as TTI (Transmission Time Index or Interval).

Downlink transmissions are dynamically scheduled, i.e., in each subframe the base station transmits control information about to which terminals data is transmitted and upon which resource blocks the data is transmitted, in the current downlink subframe. This control signaling is typically transmitted in a control region, which may comprise or comprise of the first 1, 2, 3 or 4 OFDM symbols in each subframe. The number n=1, 2, 3 or 4 is known as the Control Format Indicator (CFI) indicated by or on the physical CFI channel (PCFICH) transmitted in the first symbol of the control region. The control region may also contain physical downlink control channels (PDCCH) and possibly also physical HARQ indication channels (PHICH) carrying ACK/NACK for the uplink transmission.

Figure 2:
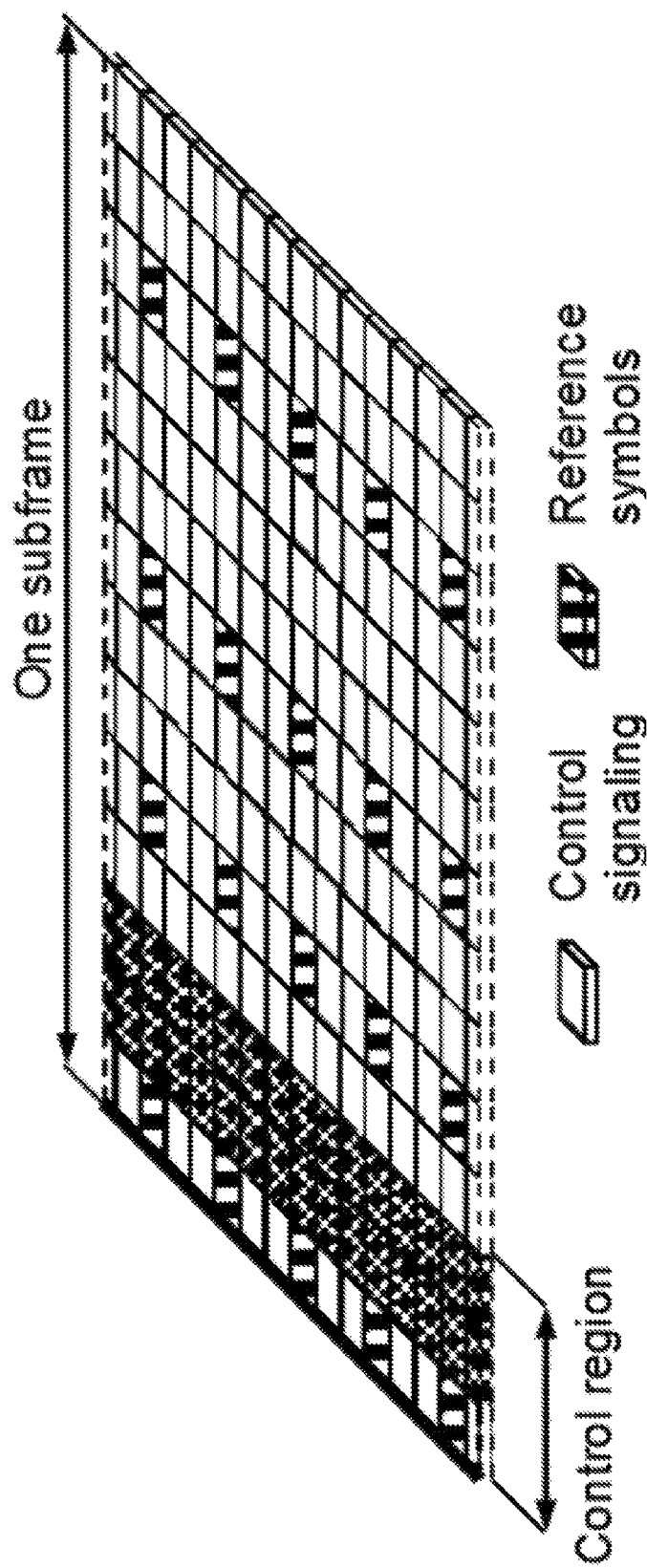
FIG. 2, showing an exemplary subframe structure.

The downlink subframe also contains common reference symbols (CRS), which are known to the receiver and used for coherent demodulation of e.g. the control information. A downlink system with CFI=3 OFDM symbols as control is illustrated in FIG. 2. In a Rel-8 TTI, one such portion of the DL transmission is termed as one TTI.

Latency reduction with short subframes is described in the following. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 13, a study item is starting during 2015, with the goal of specifying transmissions with shorter TTIs that are much shorter than the LTE release 8 TTI. The shorter TTIs can be decided to have any duration in time and may comprise resources on or in a (arbitrary) number of OFDM or SC-FDMA symbols within a 1 ms SF. As one example, the duration of the short TTI may be 0.5 ms, i.e. seven OFDM or SC-FDMA symbols for the case with normal cyclic prefix. As another example, the duration of the short TTI may be 2 symbols.

In the example of FIG. 2, the TTI length consists of 14 OFDM symbols. In case of shortened TTI, the TTI length can be reduced to 2-OFDM symbols, 4-OFDM symbols or 7-OFDM symbols. These are denoted as: 2-OS sTTI, 4-OS sTTI, 7-OS sTTI respectively. The OS herein can also be SC-FDMA (e.g. for uplink, in particular for LTE or NR) or any type of symbol, e.g. an OFDM symbol for NR. In the TTI structures shown, reference signaling is indicated as RS. Such signaling may in particular comprise DMRS. A TTI structure, e.g. a subframe as shown in FIG. 2, may comprise a control region, which may carry control information and/or a control channel, e.g. a PDCCH (Physical Downlink Control CHannel), in particular for DL.

The shortened TTI can be used in different values in different direction, such as DL and UL. For example: a DL can use 2-OS sTTI, while UL can use 4-OS sTTI in the same cell.

Figure 1:
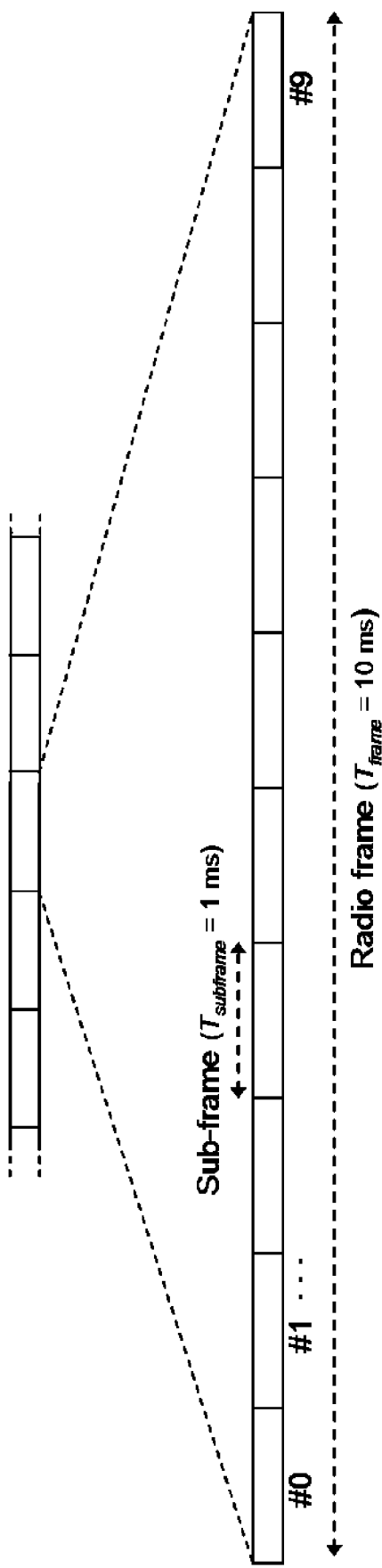
FIG. 1, showing an exemplary time domain structure for transmissions.

For different frame structures, such as FS1, FS2 and FS3, the sTTI that is used could be different too. The time domain structure in FIG. 1 relates to FS1. 2-OS, 4OS and 7 OS TTI are usable for FS1. For FS2 which is used for TDD, 7-OS sTTI is one of the shortened TTI mode. Some example TTI durations are given below.

7-Symbol TTI in DL

Figure 3:
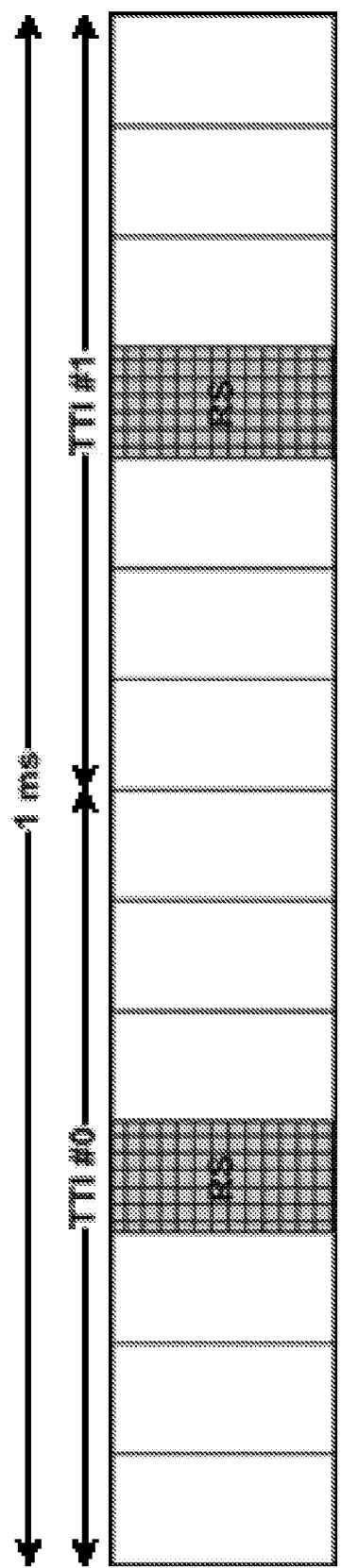
FIG. 3, showing an example of a 7-symbol TTI.
Figure 4:
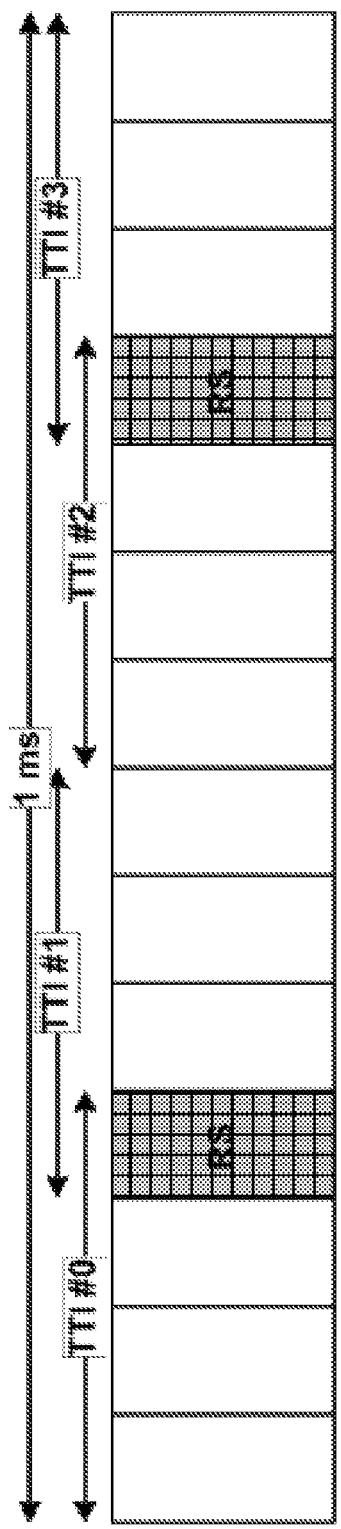
FIG. 4, showing an example of a 4-symbol TTI.

For 7-symbol TTI, the following sTTI structure may be supported for UL. FIG. 3 shows an example of 7-symbol TTI 4-Symbol TTI in DL If 4-symbol UL sTTI is supported, the following sTTI structure may be provided. FIG. 4 shows an example of 4-symbol TTI.

UL Short TTI

Figure 5:
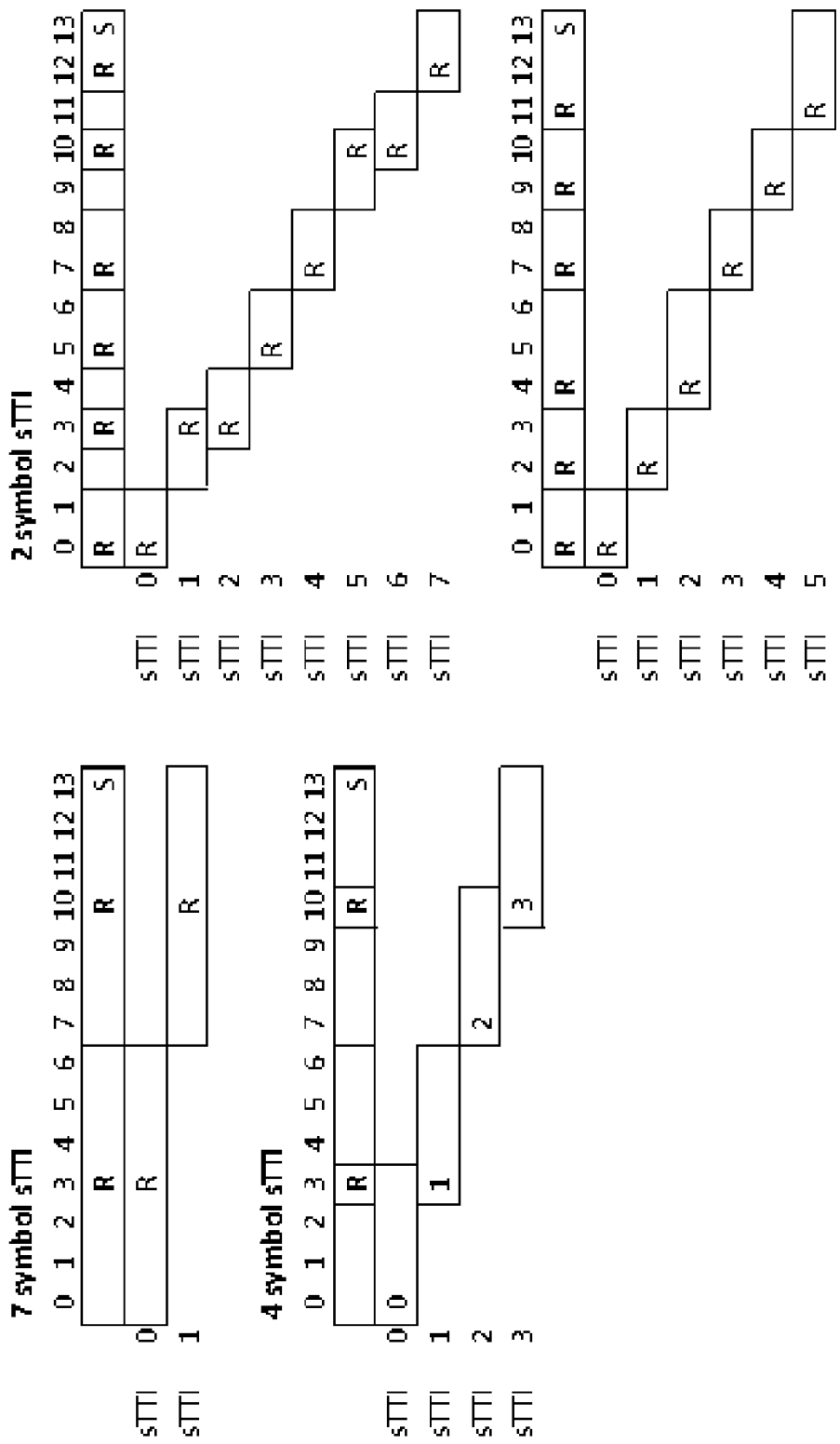
FIG. 5, showing examples of UL TTI options.

FIG. 5 shows examples of UL TTI options.

The above example shows a proposal for different TTI length. The 2-OS sTTI can have one of the two options. From UL sTTI point of view, the following is observed:

There are three different TTI lengths that are possible for UL. Out of these, different patterns possible for 2 OS TTI Dynamic indication of TTI length in fast UL grant can be done Dynamic indication of DMRS (DeModulation Reference Signal) position in fast UL grant can also be done.

For some of the TTI patterns, shared DMRS is possible between UEs. For some UEs, this also means that, they will need to send DMRS for two TTIs when the UE is scheduled across neighboring TTIs.

Although a wireless device typically operates in a well-defined portion of the frequency band, emissions outside its operating or channel bandwidth and also outside its operating frequency band are unavoidable. These emissions outside the BW or frequency band are often termed as out of band emissions or unwanted emissions. The UEs as well as base stations have to fulfill a specified set of out of band (OOB) emission requirements. The major OOB emission requirements, which are typically specified by the standards bodies and eventually enforced by the regulators in different countries and regions for both UE and the base stations comprise:

Adjacent Channel Leakage Ratio (ACLR)

Spectrum Emission Mask (SEM)

Spurious emissions

In-band unwanted emissions

These requirements ensure that the emission levels outside an operating bandwidth or band in some cases remain several tens of dB below compared to the wanted signal in the operating bandwidth. Although OOB emission level tends to decay dramatically further away from an operating band, they are not completely eliminated at least in the adjacent carrier frequencies.

A concept of maximum power reduction MPR is discussed in the following. A UE power amplifier (PA) (used for transmissions by the UE) is typically designed for certain typical operating points or configurations or set of parameter settings e.g. modulation type, number of active physical channels (e.g. resource blocks in E-UTRA or number of CDMA channelization codes code/spreading factor in UTRA). But, in practice the UE may operate using any combination of modulation, physical channels etc. Therefore, in some UL transmission scenarios, the UE power amplifier may not be able to operate in the linear zone, thereby causing OOB band emissions due to harmonics or other non-linear characteristics. To ensure that a UE fulfills OOB requirements for all allowed UL transmission configurations, the UE is allowed to reduce its maximum UL transmission power in some scenarios when it reaches its maximum power. This is called maximum power reduction (MPR) or UE power back-off in some literature. For instance, a UE with maximum transmit power of 24 dBm power class may reduce its maximum power from 24 dBm to 23 or 22 dBm depending upon the configuration.

The MPR values for different configurations are generally well specified in the standard. The UE uses these values to apply MPR when the conditions for the corresponding configurations are fulfilled. An example of MPR as function of channel BW, modulation type and resource blocks (Nrb) defined in TS 36.101 v14.1.0 is shown in table 6.2.3-1:

TABLE 6.2.3-1

Maximum Power Reduction (MPR) for Power Class 1 and 3

| Modulation | Channel bandwidth/Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |

A concept of additional maximum power reduction A-MPR is discussed in the following. In E-UTRA, an additional MPR (A-MPR) for the UE or UE transmitter has also been specified in addition to the normal MPR. The difference is that the former is not fully static. Instead, the A-MPR can vary between different cells, operating frequency bands and more specifically between cells deployed in different location areas or regions. In particular, the A-MPR is applied by the UE in order to meet the so-called additional spurious emission requirements specified by the regulatory organization.

The A-MPR includes all the remaining UE maximum output power reduction (on top of the normal MPR) needed to account for factors such as: bandwidth, frequency band, resource block allocation, requirements set by regional regulatory bodies (FCC, ARIB, European regulation etc).

To meet the regulatory emission requirements, the A-MPR required could vary from one part of the network to another. This is due to the factors such as the variable bandwidth, varying number of resource block allocation, different bands in different parts of the networks etc. Even if the deployment scenario (in terms of bands used, bandwidth size etc.) is homogeneous in a large coverage area, there will always be border regions between these coverage areas. Therefore, A-MPR is a cell specific value. Due to the above reasons, the A-MPR is signaled to the UE e.g. via system information in a UE specific channel or in a broadcast message. This allows the UE to acquire this information when it camps on to a cell. The acquired A-MPR value which is associated with a cell is then used by the UE to reduce its maximum output power whenever it transmits in the uplink. A specific parameter called network signaling (NS) to enforce A-MPR to meet the additional spurious emission requirements has been specified in E-UTRAN.

In the current specifications, the MPR and A-MPR requirements are defined for 1 ms TTI duration. The approaches disclosed accommodate, the introduction of short TTI may enable the network node to configure the UE with two (e.g., successive) TTIs, in particular such that at least partly overlap in time. Thus, reliable and predictable power control is enabled (which is based on an emission control parameter as discussed herein).

There are discussed approaches and related several variants pertaining to methods in a UE or a network node, respectively to related devices.

Generally, there may be considered a user equipment (and/or a terminal), e.g., for a wireless communication network and/or a RAN, which may be adapted for determining an emission (or transmission) control parameter based on a TTI configuration and/or structure, and/or transmitting signaling based on an emission (or transmission) control parameter, the emission control parameter being based on, and/or being determined based on, a TTI configuration and/or structure. The UE (and/or terminal) may comprise transmitting circuitry and/or a transmitting module adapted for such transmitting, and/or a determining module and/or control circuitry adapted for such determining.

There may be considered a method for operating a user equipment (and/or a terminal) in a wireless communication network and/or a RAN. The method comprises determining an emission (or transmission) control parameter based on a TTI configuration and/or structure, and/or transmitting signaling based on an emission (or transmission) control parameter, the emission control parameter being based on, and/or being determined based on, a TTI configuration and/or structure.

Determining an emission (or transmission) control parameter based on a TTI configuration and/or structure, and/or transmitting signaling based on an emission (or transmission) control parameter, which is based on a TTI configuration and/or TTI structure, may be based on the TTI configuration and/or TTI structure comprising one or more overlapping short TTIs (or not). If one or more overlapping short TTIs are present, one emission control parameter may be determined (e.g., chosen or selected or set), if not, another emission control parameter may be determined. The UE may be adapted for such determining.

Generally, the TTI configuration and/or TTI structure may comprise at least two (e.g., at least partially) overlapping TTIs, which may be short TTIs. Overlapping may be in time. Partially overlapping may refer to two TTIs sharing a common time interval, e.g. covering a common time interval, e.g. one or more symbols or a part thereof.

The TTI configuration and/or TTI structure may be configured to the UE, and/or may be predetermined. Determining a TTI configuration and/or TTI structure may comprise selecting and/or choosing from one or more TTI configuration and/or structures. Determining the TTI configuration and/or TTI structure may comprise receiving the TTI configuration and/or TTI structure, e.g. by receiving circuitry and/or a receiving module of the UE. Generally, to different TTI configurations and/or TTI structures there may be assigned different emission control parameters (at least one parameter may differ); the different TTI configurations and/or TTI structures may pertain to the same cell, and/or be defined and/or configurable for the same cell.

Generally, a TTI configuration may indicate and/or represent and/or configure a TTI structure, and/or one or more TTIs, which may be short TTIs. A TTI structure may comprise one or more TTIs, which may be short TTIs. A short TTI may be shorter (in time, or represent a time interval shorter) than a subframe and/or a slot (half a subframe), and/or represent 7 or less, 6 or less, 5 or less, 4 or less, 3 or less, or 2 or less transmission symbols and/or transmission symbol intervals. It may be considered that a TTI structure pertains to scheduled and/or intended transmission, and/or that transmission is performed thereon or therein.

A TTI structure may comprise, and/or be associated to, one or more frequency resource/s for transmission, which may indicate a frequency range or bandwidth for transmission, and/or one of more subcarriers (which may e.g., be continuous in frequency space, and/or comprise, or consist of, 12 or more subcarriers) and/or one or more carrier/s. In some cases, different frequency resources may be associated to different short TTIs and/or short TTIs of a TTI structure.

A TTI configuration and/or TTI structure may pertain to, and/or indicate, a TTI cover time interval for the TTI configuration and/or in which the TTI structure is arranged or valid, e.g. a subframe. The short TTIs of the configuration, and/or the TTI structure, may be covered by, and/or inserted in, the TTI cover time interval, and/or the TTI cover time interval may encompass the short TTIs of the configuration and/or the TTI structure.

A configuration may be valid for more than one TTI cover time intervals, e.g. repeating the TTI structure and/or arrangement of short TTIs (in particular, in the time domain, frequency resources may be repeated or changed, e.g. newly configured and/or scheduled). A TTI configuration and/or TTI structure may pertain to one (exactly one) cell, e.g. a serving cell, and/or the short TTIs of the TTI configuration and/or TTI structure may pertain to the same cell. The cell may generally be a serving cell, and/or a cell of a carrier aggregate. Alternatively, the TTI configuration and/or TTI structure may pertain to a direct communication link (e.g., sidelink and/or D2D), e.g. to another UE or terminal. One or more of the short TTIs of a TTI structure and/or TTI configuration may overlap (at least in part) with one or more of the other short TTIs of the TTI configuration and/or TTI structure. Such short TTIs may be referred to as overlapping TTIs. Alternatively, or additionally, the TTI configuration and/or TTI structure may comprise at least one short TTI not overlapping with another TTI (e.g., of the TTI structure and/or TTI configuration). Such TTIs may be referred to as non-overlapping TTIs. Generally, short TTIs of a TTI structure and/or TTI configuration may have different durations and/or lengths. In some cases, the lengths or durations of short TTIs in a TTI structure and/or TTI configuration may be the same.

A transmission symbol interval may represent the time interval (which may be considered to represent the length or duration) for a transmission symbol, e.g. in the uplink and/or on a sidelink, and/or for transmission by a UE or terminal. A transmission symbol, to which the interval may pertain to, may be a SC-FDMA symbol (e.g., for LTE or NR), or a OFDMA symbol (e.g., for NR). The interval may be for a symbol with normal cyclic prefix, or with extended cyclic prefix.

An emission (or transmission) control parameter may comprise one or more parameters. The emission control parameter may be considered to be, and/or represent a UE emission (or transmission) control parameter, e.g. due to referring to transmission by a UE. In particular, such a parameter may pertain to and/or represent and/or parametrize and/or indicate a transmission power, and/or a transmission power limitation. A transmission power limitation may represent and/or indicate and/or parametrize and/or pertain to an upper (or lower) limit for transmission power, and/or a modification of such a limit, e.g. a value to be added or subtracted from a (e.g., upper) limit. The emission (or transmission) control parameter may pertain to transmission by the user equipment or terminal.

An emission control parameter generally may be a transmission control parameter or a transmission power control parameter. In particular, an emission control parameter may represent and/or indicate and/or parametrize and/or pertain to MPR and/or A-MPR. It may be considered that the (UE) emission control parameter may be configured or indicated to the UE, e.g. by a network or network node, in particular with control signaling and/or transmission of configuration data. Alternatively, the emission control parameter may be determined based on a TTI configuration or TTI structure, e.g. by mapping an indication of the TTI configuration and/or TTI structure (which may be configured to the UE) to the emission control parameter, for example based on a table (which may index the indication to the parameter), and/or based on a function and/or relation, which may be pre-defined. Generally, the emission control parameter may comprise and/or represent MPR, e.g. as determining as disclosed herein, e.g., based on a ceiling (see below).

Transmitting signaling based on an emission control parameter may be considered to comprise transmitting utilising the parameter and/or to comply with a limitation set or defined by the parameter, e.g. in terms of transmission power. Generally, transmitting signaling may pertain to, and/or be performed in and/or to, one cell, e.g. such that all signaling pertaining to the TTI configuration and/or TTI structure is done in and/or to the same cell, e.g. a serving cell. Transmitting signaling may generally be in the uplink (or sidelink).

There may be considered a method in and/or for operating a UE, the method comprising one or more of the following, and/or UE or terminal for a wireless communication network and/or RAN, which is adapted for performing one or more of the following:

Step-1: (optional): Determining a TTI configuration, e.g. to be used by the UE, in particular for transmitting signaling (e.g. for operating signals (S) between the UE and a first serving cell (cell1)), for example on a first cell, wherein the TTI configuration is one of:
 a first TTI configuration (CONF1) comprising of a first TTI (TTI1), which does not overlap with any other TTI in time,
 a second TTI configuration (CONF2) comprising of TTI1 and a second TTI (TTI2), which at least partly overlaps with each other in time. The UE may comprise a determining module for such determining.

Step-2: (optional): Determining an UE emission control parameter (Pe) based on the determined TTI configuration, wherein:
 Pe comprises of a first UE emission control parameter (Pe1) when CONF1 is used, and
 Pe comprises of a second UE emission control parameter (Pe2) when CONF2 is used. The UE may comprise a parameter determining module for such determining.

Step-3: Transmitting signaling, e.g. the signals (S) to cell1, based on the (determined and/or configured) UE emission control parameter. The UE may comprise a transmitting module for such transmitting.

There may be considered a network node for a wireless communication network and/or for a RAN. The network node may be adapted for receiving signaling from a UE and/or terminal based on an emission control parameter, the emission control parameter being based on and/or being determined based on a TTI configuration and/or TTI structure pertaining to the UE and/or terminal. The network node may be adapted for determining the TTI configuration and/or TTI structure, and/or for configuring the UE and/or terminal with the TTI configuration and/or TTI structure and/or the emission control parameter. It may be considered that the network node comprises receiving circuitry and/or a receiving module for receiving signaling as discussed herein. Alternatively or additionally, the network node may comprise control and/or transmitting circuitry, and/or a determining module and/or configuring module, for determining the TTI configuration and/or TTI structure, and/or to configure the UE or terminal therewith.

A method for operating a network node in a wireless communication network and/or a RAN may be considered. The method may comprise receiving signaling from a UE and/or terminal based on an emission control parameter, the emission control parameter being based on and/or being determined based on a TTI configuration and/or TTI structure pertaining to the UE and/or terminal. It may be considered that the method may comprise determining the TTI configuration and/or TTI structure, and/or configuring the UE and/or terminal with the TTI configuration and/or TTI structure and/or the emission control parameter.

Determining and/or configuring an emission control parameter may comprise determining and/or configuring MPR, e.g. as discussed below and/or herein.

Generally, there may be considered a network node for a wireless communication network and/or RAN, the network node being adapted for performing one or more of the following, and/or a method in or for operating a network node in a wireless communication network and/or RAN, the method comprising one or more of the following:

Step-1N (optional): Determining a TTI configuration used by the UE for operating signals (S) between the UE and a first serving cell (cell1), wherein the TTI configuration is one of:

a first TTI configuration (CONF1) comprising of a first TTI (TTI1), which does not overlap with any other TTI in time, a second TTI configuration (CONF2) comprising of TTI1 and a second TTI (TTI2), which at least partly overlaps with each other in time. The network node may comprise control circuitry and/or a determining module for such determining.

Step-2N (optional): Determining an UE emission control parameter (Pe) based on the determined TTI configuration, wherein:

Pe comprises of a first UE emission control parameter (Pe1) when CONF1 is used, and Pe comprises of a second UE emission control parameter (Pe2) when CONF2 is used. The network node may comprise a parameter determining module for such determining.

Step-3N (optional): Receiving signaling, e.g. the signals (S) from the UE in cell1 transmitted by the UE, based on the determined UE emission control parameter. The network node may comprise a receiving module for such receiving.

In another variant, there may be considered a network node for a wireless communication network and/or RAN, the network node being adapted for performing one or more of the following, and/or a method in or for operating a network node in a wireless communication network and/or RAN, the method comprising one or more of the following:

Step-1NN (optional): Determining an UE emission control parameter, e.g. an allowed value of an emission control parameter (Pe) to be used by a UE for operating signals (S) between the UE and a first serving cell (cell1) and/or for transmitting signaling. The network node may comprise a determining module for such determining.

Step-2NN (optional): Determining a TTI configuration associated with the determined UE emission control parameter (Pe), wherein:

If the determined Pe is a first UE emission control parameter (Pe1) then selecting a first TTI configuration (CONF1) comprising of a first TTI (TTI1) which does not overlap with any other TTI in time, and If the determined Pe comprises of a second UE emission control parameter (Pe2) then selecting a second TTI configuration (CONF2) comprising of TTI1 and a second TTI (TTI2), which at least partly overlaps with each other in time.

Step-3NN (optional): Configuring the UE with the determined TTI configuration. The network node may comprise a configuring module for such configuring.

Step-4NN: Receiving signaling, e.g. the signals (S) from the UE in cell1 transmitted by the UE, based on the determined UE emission control parameter and the configured TTI configuration. The network node may comprise a receiving module for such receiving.

Following advantages may be obtained according to approaches disclosed herein:

The UE behavior with respect to UE radio emissions under overlapping TTI patterns is well defined; and/or The UE behavior with respect to UE radio emissions when the TTI configuration changes between overlapping TTI patterns and non-overlapping TTI patterns is well defined; and/or The UE can meet the radio emission requirements when the UE is configured to operate using overlapping TTIs.

In some variants, a term "node" is used. An example of a node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

In some variants, generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

Another example of a node is user equipment, this is a non-limiting term user equipment (UE) and it refers to any type of wireless device communicating with a network node and/or with another UE in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc.

A component carrier (CC) also interchangeably called as carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell etc) operating on the configured CC. The configured CC is also used by the UE for performing one or more radio measurements (e.g. RSRP, RSRQ etc) on the cells operating on the CC e.g. PCell, SCell or PSCell and neighboring cells.

The term radio access technology, or RAT, may refer to any RAT e.g. UTRA, E-UTRA, narrow band internet of things (NB-IoT), WLAN, Bluetooth, next generation RAT (NR), 4G, 5G, etc. A UE may be capable of supporting single RAT or multiple RATs.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE.

The term time resource used herein may correspond to any type of physical resource or radio resource expressed in terms of length of time. Examples of time resources are: symbol, time slot, subframe, radio frame, TTI, interleaving time, etc. The term TTI used herein may correspond to any time period (T0) over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe etc.

The term UE emission control parameter or simply emission control parameter used herein indicates the value associated with any emission requirement which the UE is supposed to meet when transmitting signals in the uplink. The examples of emission requirements are out of band emissions or more specifically spurious emission, additional spurious emission etc.

Typically, each emission control parameter may be associated with one emission requirement. Hence more than one emission control parameters may be signaled to the UE for meeting multiple set of emission requirements. Examples of emission control parameters are MPR, Network signaling (NS) parameter etc. The NS value is used by the UE for apply certain A-MPR (i.e. reduces its max power) to meet additional emission requirements. The network may signal different emission control parameter values depending upon the criticality level of the network scenario. For example, A-MPR may be 0 dB for public safety operation but 10 dB for normal mobile communication. Hence if received NS value corresponds to A-MPR of 10 dB, the UE may assume that it is operating under normal mobile communication; accordingly, it may meet the corresponding requirements for mobile communication.

There are discussed in more detail several variants, including:

Description of a scenario involving different TTI patterns;
A method in a UE of determining and applying UE emission control parameter based on TTI configuration;
A method in a network node of determining and adapting procedures based on UE emission control parameter adapted to TTI configuration;
A method in a network node of adapting TTI configuration for controlling UE transmissions;

Scenarios involving different TTI patterns are discussed in the following. A scenario may pertain to a UE configured with at least one serving cell (e.g. PCell) aka single carrier operation. The UE herein is capable of operating signals between the UE and the serving cell using two different TTI configurations: a first TTI configuration (CONF1) and a second TTI configuration (CONF2). In operation under CONF1 the TTI does not overlap with any other TTI in time. In operation under CONF2, two consecutive TTIs (e.g. TTI1 and TTI2) at least partly overlap in time. For example, their symbol containing reference signals (e.g. DMRS) overlap in time.

The scenario may further comprise a UE configured with at least two serving cells (e.g. PCell, PSCell and SCell, etc) aka carrier aggregation, multicarrier operation, dual connectivity, multi-connectivity etc. In this case, the UE may be configured with any of TTI configuration on any of its serving cells.

In the above scenarios, the TTI configuration may remain the same or it may change over time e.g. from CONF1 to CONF2 or vice versa.

Methods in a UE of determining and applying UE emission control parameter based on TTI configuration are discussed in the following. There is disclosed a method in a
UE comprising the steps of:
Step-1: Determining a TTI configuration to be used by the UE for operating signals (S) between the UE and a first serving cell (cell1), wherein the TTI configuration is one of:
a first TTI configuration (CONF1) comprising of a first TTI (TTI1), which does not overlap with any other TTI in time,
a second TTI configuration (CONF2) comprising of TTI1 and a second TTI (TTI2), which at least partly overlaps with each other in time.
Step-2: Determining an UE emission control parameter (Pe) based on the determined TTI configuration, wherein:
Pe comprises of a first UE emission control parameter (Pe1) when CONF1 is used, and
Pe comprises of a second UE emission control parameter (Pe2) when CONF2 is used,
Step-3: Transmitting the signals (S) to cell1 based on the determined UE emission control parameter.

Step-1 as discussed above in several instances is discussed in more detail as follows. In this step, the UE may determine or identify a TTI configuration to be used by the UE for transmitting signaling or operating signals (S) between the UE and a first serving cell (cell1) of the UE. If the UE is configured with plurality of serving cells (e.g. PCell, SCell etc) then the UE may further determine each TTI configuration to be used by the UE for operating signals between the UE and each of the corresponding serving cell. For the sake of simplicity, the variants are described for one serving cell (i.e. cell1). But they are applicable to any number of serving cells since the same method can be independently applied to any serving cell.

The TTI configuration used herein may comprise of any one of the following:
a first TTI configuration (CONF1) comprising of a first TTI (TTI1), which does not overlap with any other TTI in time,
a second TTI configuration (CONF2) comprising of TTI1 and a second TTI (TTI2), which at least partly overlaps with each other in time.

The TTI1 and TTI2 used herein may refer to at least TTIs used by the UE for transmitting uplink signals in cell1. In one example, the same TTI (e.g. TTI1) may be used by the UE for operating signals in both uplink and downlink of cell1. In another example, the different TTIs may be used by the UE for operating signals in uplink and downlink of cell1 e.g. TTI1*u* and TTI2*d* in UL and DL, respectively, of cell1. The variants are applicable regardless of whether the same or different TTIs are used by the UE in the same cell i.e. cell1.

In CONF1, the TTI1 does not overlap with any successive or consecutive TTI. But in CONF2, the TTI1 and TTI2 at least partly overlap in time with each other. In other words, the UE may be configured with two successive or consecutive TTIs with at least one overlapping time resource (e.g. one symbol). In CONF2, TTI1 and TTI2 can be of the same length in time or they can of different length in time. In the latter case: in one example the leading TTI can be larger than the trailing TTI (i.e. TTI1>TTI2) while in second example the leading TTI can be smaller than the trailing TTI (i.e. TTI1<TTI2). The overlapping part of the two successive TTIs in time is typically one or more symbols containing a reference signal. Examples of reference signals are DMRS, SRS et. CONF2 may also interchangeably called as TTI configuration comprising of two consecutive TTIs with common DMRS, TTI configuration comprising of two consecutive TTIs with shared DMRS, TTI configuration comprising of two consecutive TTIs with common or overlapping symbol(s), TTI configuration comprising of two consecutive TTIs with common or overlapping symbol(s) containing reference signals, or simply TTI configuration with common or shared DMRS or reference signal or symbols etc.

A specific example of CONF2 where TTI1 and TTI2 are of equal length (i.e. 4 OFDM symbols) is shown in FIG. 4.

The UE configured with CONF1 may use TTI1 for operating a first signals (S1) between the UE and cell1 i.e. S=S1. The UE configured with CONF2 may use TTI1 for operating a first signals (S1) between the UE and cell1 and TTI2 for operating a second signals (S2) between the UE and cell1 i.e. S=SI in TTI1 and S=S2 in TTI2.

The UE can generally determine the TTI configuration, e.g. whether it is configured with CONF1 or with CONF2 for operating S in cell1, based on any of the following 690 mechanisms:

- indication received from the network node e.g. indicator sent via DL control channel, MAC command etc.,
- message such as configuration information received from the network node e.g. RRC message,
- pre-defined information, rule or requirement. For example it may be pre-defined that in certain time resources the UE is allowed to use CONF1 while in some other time resources the UE is allowed to use CONF2,
- based on condition or event. For example under certain condition the UE may use CONF1 while under some other condition it may use CONF2.
- Autonomous selection by the UE,
- Previous transmissions e.g. transmission in the last N TTIs, etc.

The term operating signals (S) between cell1 and the UE herein may comprise of reception of signals by the UE from cell1 and/or transmission of signals by the UE to cell1. Examples of S when receiving signals from cell1 at the UE are DL channels such as PDCCH, PDSCH, sPDCCH, sPDSCH etc. Examples of S when transmitting signals by the UE to cell1 are UL channels such as PUCCH, PUSCH, sPUCCH, sPUSCH etc.

Step-2 as discussed above in several instances is discussed in more detail as follows. In this step, the UE may determine at least one UE emission control parameter (Pe) based on the determined TTI configuration in step-1. The UE may determine the UE emission control parameter (Pe) based on the association or relation between Pe and the TTI configuration. The relation between Pe and the TTI configuration can be obtained or determined by the UE based on any one or more of the following mechanism:

- pre-defined,
- configured by the network node,
- obtained by the UE autonomously (e.g. based on characteristics or performance of the UE radio circuitry such as PA efficiency etc).
- Historical data or statistics e.g. the relation used in the past or the one used in certain time period.

Examples of relations between Pe1 and Pe2 with the first TTI configuration (CONF1) and the second TTI configuration (CONF2) respectively are expressed in (1) and (2):

$$Pe1=f(CONF1) \quad (1)$$

$$Pe2=f1(CONF2) \quad (2)$$

In a specific example Pe1 and Pe2 may correspond to MPR1 and MPR2 respectively. In another example Pe1 and Pe2 may correspond to A-MPR1 and A-MPR2 respectively. In these examples the emission control parameters (MPR and A-MPR) can be expressed by (3), (4), (5) and (6):

$$MPR1=f2(CONF1) \quad (3)$$

$$MPR2=f3(CONF2) \quad (4)$$

$$A\text{-}MPR1=f4(CONF1) \quad (5)$$

$$A\text{-}MPR2=f5(CONF2) \quad (6)$$

In yet another example, Pe2 can be derived based on a function of Pe11 and Pe12 as expressed by (7):

$$Pe2=f6(Pe11,Pe12) \quad (7)$$

wherein Pe11 and Pe12 are the values of the emission control parameters applicable for UE operation in TTI1 and TTI2, respectively, when TTI1 and TTI2 don't overlap in time. More specifically the UE may apply Pe11 when transmitting signals to cell1 during TTI1 if it does not overlap with TTI2 in time. Similarly, the UE may apply Pe12 when transmitting signals to cell1 during TTI2 if it does not overlap with TTI1 in time.

In any of the expressions examples of functions are maximum, minimum, average, xth percentile etc.

For example, Pe11=Pe1 if TTI1 doesn't overlap with TTI2 in time. Similarly, as an example, Pe12=Pe1 if TTI2 doesn't overlap with TTI1 in time.

The UE determined Pe2 using (7) as follows:
- obtains Pe11 and Pe12 based on any of the mechanisms mentioned above (i.e. same as for obtaining Pe),
- determined that TTI1 and TTI2 at least partly overlap in time (i.e. CONF2 is used) and
- use function in (7) to derive one common value of Pe2.

A specific example of function to derive Pe2 is expressed in (8):

$$Pe2=MAX(Pe11,Pe12) \quad (8)$$

Other general examples for deriving Pe2 when Pe2 is MPR2 or A-MPR2 are expressed in (9) and (10):

$$MPR2=f7(MPR11,MPR12) \quad (9)$$

$$A\text{-}MPR2=f8(A\text{-}MPR11,A\text{-}MPR12) \quad (10)$$

Other specific examples for deriving MPR2 and A-MPR2 are expressed in (11) and (12):

$$MPR2=MAX(MPR11,MPR12) \quad (11)$$

$$A\text{-}MPR2=MAX(A\text{-}MPR11,A\text{-}MPR12) \quad (12)$$

wherein MPR11 and MPR12 are the values of the MPR applicable for UE operation in TTI1 and TTI2 respectively when TTI1 and TTI2 don't overlap in time. Similarly, A-MPR11 and A-MPR12 are the values of the A-MPR applicable for UE operation in TTI1 and TTI2 respectively when TTI1 and TTI2 don't overlap in time.

An example of MPR1 values for CONF1 with TTI1 of 4-OFDM symbols (4-OS) is shown in table 1. The MPR2 for CONF2 can be derived from this table. For example assume that set 6 and set 7 are used in TTI1 and TTI2, which share the DMRS symbol. The MPR11 and MPR12 in TTI1 and TTI2 will be 1 dB and 2 dB respectively. The effective or overall MPR (i.e. MPR2) for CONF2 based on maximum function will be 2 dB i.e. max(1,2)=2 dB. In this example the UE when using CONF2 based on TTI of 4-OS using set 6 and set 7 will apply 2 dB MPR when transmitting signals in the serving cell.

TABLE 1

UE MPR for 1 ms TTI and 4-OS TTI

| Set | TTI | Modulation | Channel bandwidth/Transmission bandwidth ($N_{RB}$) | | | | | | MPR (dB) |
|---|---|---|---|---|---|---|---|---|---|
| | | | 1.4 MHz | 3.0 MHz | 5 MHz | 10 MHz | 15 MHz | 20 MHz | |
| 1 | 1 ms | QPSK | >5 | >4 | >8 | >12 | >16 | >18 | ≤1 |
| 2 | 1 ms | 16 QAM | ≤5 | ≤4 | ≤8 | ≤12 | ≤16 | ≤18 | ≤1 |
| 3 | 1 ms | 16 QAM | >5 | >4 | >8 | >12 | >16 | >18 | ≤2 |
| 4 | 1 ms | 64 QAM | ≤5 | ≤4 | ≤8 | ≤12 | ≤16 | ≤18 | ≤2 |
| 5 | 1 ms | 64 QAM | >5 | >4 | >8 | >12 | >16 | >18 | ≤3 |
| 6 | 4-OS | QPSK | >5 | >4 | >8 | >12 | >16 | >18 | ≤1 |
| 7 | 4-OS | 16 QAM | ≤5 | ≤4 | ≤8 | ≤12 | ≤16 | ≤18 | ≤2 |
| 8 | 4-OS | 16 QAM | >5 | >4 | >8 | >12 | >16 | >18 | ≤2 |
| 9 | 4-OS | 64 QAM | ≤5 | ≤4 | ≤8 | ≤12 | ≤16 | ≤18 | ≤3 |
| 10 | 4-OS | 64 QAM | >5 | >4 | >8 | >12 | >16 | >18 | ≤3 |

Note 1:
DMRS in TTI number n is shared with TTI number n + 1.

Step-3 as discussed above in several instances is discussed in more detail as follows. In this step, the UE may use or apply the determined UE emission control parameter when transmitting signals in cell1. For example, if the UE is configured with CONF1 then the UE transmits signals in cell1 while applying Pe1. In another example, if the UE is configured with CONF2 then the UE transmits signals in cell1 while applying Pe2. For example, assuming that MPR and A-MPR are 1 dB and 2 dB for CONF1 and CONF2, respectively, for certain transmission configuration parameters e.g. modulation, channel BW, resource block allocation etc. The UE may reduce its transmit power by 2 dB when the UE transmits signals in TTI1 and TTI2 in cell1 when using CONF2. Similarly, the UE may reduce its transmit power by 1 dB when the UE transmits signals in TTI1 in cell1 when using CONF1.

Methods in a network node of determining and adapting procedures based on UE emission control parameter adapted to TTI configuration are discussed below. There may be considered a method in a network node comprising the steps of:
   Step-1N: Determining a TTI configuration used by the UE for operating signals (S) between the UE and a first serving cell (cell1), wherein the TTI configuration is one of:
   a first TTI configuration (CONF1) comprising of a first TTI (TTI1), which does not overlap with any other TTI in time,
   a second TTI configuration (CONF2) comprising of TTI1 and a second TTI (TTI2), which at least partly overlaps with each other in time.
   Step-2N: Determining an UE emission control parameter (Pe) based on the determined TTI configuration, wherein:
   Pe comprises of a first UE emission control parameter (Pe1) when CONF1 is used, and
   Pe comprises of a second UE emission control parameter (Pe2) when CONF2 is used,
   Step-3N: Receiving the signals (S) from the UE in cell1 transmitted by the UE based on the determined UE emission control parameter.

Step-1N as discussed above in several instances is discussed in more detail in the following. In this step, the network node may determine or identifies a TTI configuration to be used by the UE for transmitting signaling, e.g. operating signals (S) between the UE and a first serving cell (cell1) of the UE.

If the UE is configured or is expected to be configured with plurality of serving cells (e.g. PCell, SCell etc), then the network node may further determine each TTI configuration to be used by the UE for operating signals between the UE and each of the corresponding serving cell. The TTI configuration used herein may comprise of any one of the following:
   a first TTI configuration (CONF1) comprising of a first TTI (TTI1), which does not overlap with any other TTI in time,
   a second TTI configuration (CONF2) comprising of TTI1 and a second TTI (TTI2), which at least partly overlaps with each other in time.

The TTI1 and TTI2 used herein may refer to at least TTIs used by the UE for transmitting uplink signals in cell1. In one example the same TTI (e.g. TTI1) may be used by the UE for operating signals in both uplink and downlink of cell1. In another example the different TTIs may be used by the UE for operating signals in uplink and downlink of cell1 e.g. TTI1$u$ and TTI2$d$ in UL and DL, respectively, of cell1. The variants are applicable regardless of whether the same or different TTIs are used by the UE in the same cell i.e. cell1.

The CONF1 and CONF2 are the same as described above (UE variant). They are also determined by the same principles as described herein.

Step-2N as discussed above in several instances is discussed in more detail in the following. In this step, the network node may determine at least one UE emission control parameter (Pe) based on the determined TTI configuration in step-1N of the network node variant. The network node may determine the UE emission control parameter (Pe) based on the association or relation between Pe and the TTI configuration. The relation between Pe and the TTI configuration can be obtained by the network node based on any one or more of the following mechanism:
pre-defined,
obtained by the network node autonomously (e.g. based on characteristics or performance of the UE radio circuitry such as PA efficiency etc).
The network node may determine the characteristics or performance of the UE radio circuitry based on received UE signals and/or UE capability information sent by the UE to the network node.
Historical data or statistics e.g. the relation used in the past or the one used in certain time period.
Examples of relations between Pe1 and Pe2 with the first TTI configuration (CONF1) and the second TTI configuration (CONF2), respectively, are the same as expressed and described herein (UE variants).

Step-3N as discussed above in several instances is discussed in more detail in the following. In this step, the network node may receive signaling, e.g. signal (S) from the UE in cell1 based on the determined UE emission control parameter and also based on the TTI configuration used by the UE for transmitting the signal, S, in cell1.

For example, if CONF1 is used by the UE, then the network node receives signal S1 transmitted by the UE in cell1 after applying Pe1. But if CONF2 is used by the UE then the network node receives signal S2 transmitted by the UE in cell1 after applying Pe2. In another aspect of this variant the network node may adapt its receiver configuration based on whether the UE applies the emission parameter Pe1 or Pe2 for transmitting signals. The adaptation will ensure that the network node is able to receive and decode the signals from the UE regardless of the TTI configuration and emission control parameter used for transmitting signals in cell1.

Methods in a network node of adapting TTI configuration for controlling UE transmissions are discussed in more detail in the following. There may be considered e.g. another method in a network node comprising the steps of:
Step-1NN: Determining an allowed value of an emission control parameter (Pe) to be used by a UE for operating signals (S) between the UE and a first serving cell (cell1),
Step-2NN: Determining a TTI configuration associated with the determined UE emission control parameter (Pe), wherein:
If the determined Pe is a first UE emission control parameter (Pe1) then selecting a first TTI configuration (CONF1) comprising of a first TTI (TTI1) which does not overlap with any other TTI in time, and
If the determined Pe comprises of a second UE emission control parameter (Pe2) then selecting a second TTI configuration (CONF2) comprising of TTI1 and a second TTI (TTI2), which at least partly overlaps with each other in time.
Step-3NN: Configuring the UE with the determined TTI configuration,
Step-4NN: Receiving the signals (S) from the UE in cell1 transmitted by the UE based on the determined UE emission control parameter and the configured TTI configuration.

Step-1NN as discussed above in several instances is discussed in more detail in the following. In this step, the network node may determine or select an emission control parameter (respectively its value), e.g. an allowed value of an emission control parameter (Pe) to be used by a UE for operating signals (S) between the UE and a first serving cell (cell1).

The allowed value of Pe may be determined by the network node based on one or more of the following conditions or mechanisms:
Receiver configuration of the network node in cell1 e.g. whether the network node can receive signals from the UE based on Pe1 or Pe2 or any of Pe1 and Pe2.
UE transmitter characteristics e.g. whether the UE can meet emission requirements by applying Pe1 or Pe2 or any of Pe1 and Pe2.
UE Coverage e.g. path loss between the UE and the base station serving cell1.
UE power class e.g. maximum output power (e.g. 23 dBm).
Deployment scenario e.g. cell size, cell range etc.

Step-2NN as discussed above in several instances is discussed in more detail in the following. In this step, the network node may determine, e.g. based on the selected or determined a value of Pe in step-1, a TTI configuration to be used by the UE for operating signals (S) between the UE and a first serving cell (cell1) of the UE. The TTI configuration can be CONF1 or CONF2.

The network node may determine the TTI configuration based on the determined UE emission control parameter (Pe) based on the association or relation between Pe and the TTI configuration. The relation between Pe and the TTI configuration can be obtained by the network node based on any one or more of the following mechanism:
pre-defined,
obtained by the network node autonomously (e.g. based on characteristics or performance of the UE radio circuitry such as PA efficiency etc). The network node may determine the characteristics or performance of the UE radio circuitry based on received UE signals and/or UE capability information sent by the UE to the network node.
Historical data or statistics e.g. the relation used in the past or the one used in certain time period.
Examples of relations between Pe1 and Pe2 with the first TTI configuration (CONF1) and the second TTI configuration (CONF2), respectively, are the same as expressed and described herein (UE variants).

Step-3NN as discussed above in several instances is discussed in more detail in the following. In this step, the network node may configure the UE with the TTI configuration determined in step-2NN. The configured TTI configuration can be any of CONF1 and CONF2.

The configuration can be performed by transmitting an indicator or message to the UE via signaling. Examples of signaling means are layer 1 signalling (e.g. PDCCH, Spdcch, EPDCCH etc), layer-2 signaling (e.g. MAC message) or layer-3 message (e.g. RRC message).

Step-4NN as discussed above in several instances is discussed in more detail in the following. In this step, the network node may receive signaling, e.g. signals from the UE in cell1 based on the configured TTI configuration, which in turn is determined based on the allowed value of the UE emission control parameter. The network node may receive, decode and process the signals transmitted by the UE. The network node may further adapt its receiver configuration based on whether the UE is configured with CONF1 or with CONF2 which are associated with different value of Pe. The adaptation will ensure that the network node is able to receive and decode the signals from the UE regardless of the TTI configuration and emission control parameter used by the UE for transmitting signals in cell1.

There may be considered a UE adapted for performing any one or any combination of actions associated to a UE below, and/or method for operating a UE accordingly.

The following section can be modified in 3GPP TS 36.101 v14.1.0. 6.2.3 UE maximum output power for modulation/ channel bandwidth MPR, e.g. determined by a network node and/or a UE, may be determined as follows:

For UE Power Class 1 and 3, the allowed Maximum Power Reduction (MPR) for the maximum output power in Table 6.2.2-1 due to higher order modulation and transmit bandwidth configuration (resource blocks) is specified in Table 6.2.3-1.

TABLE 6.2.3-1

Maximum Power Reduction (MPR) for Power Class 1 and 3

| TTI | Modulation | Channel bandwidth/Transmission bandwidth ($N_{RB}$) | | | | | | MPR (dB) |
|---|---|---|---|---|---|---|---|---|
| | | 1.4 MHz | 3.0 MHz | 5 MHz | 10 MHz | 15 MHz | 20 MHz | |
| 1 ms | QPSK | >5 | >4 | >8 | >12 | >16 | >18 | ≤1 |
| 1 ms | 16 QAM | ≤5 | ≤4 | ≤8 | ≤12 | ≤16 | ≤18 | ≤1 |
| 1 ms | 16 QAM | >5 | >4 | >8 | >12 | >16 | >18 | ≤2 |
| 1 ms | 64 QAM | ≤5 | ≤4 | ≤8 | ≤12 | ≤16 | ≤18 | ≤2 |
| 1 ms | 64 QAM | >5 | >4 | >8 | >12 | >16 | >18 | ≤3 |
| 4-OFDM symbols | QPSK | >5 | >4 | >8 | >12 | >16 | >18 | ≤1 |
| 4-OFDM symbols | 16 QAM | ≤5 | ≤4 | ≤8 | ≤12 | ≤16 | ≤18 | ≤1 |
| 4-OFDM symbols | 16 QAM | >5 | >4 | >8 | >12 | >16 | >18 | ≤2 |
| 4-OFDM symbols | 64 QAM | ≤5 | ≤4 | ≤8 | ≤12 | ≤16 | ≤18 | ≤2 |
| 4-OFDM symbols | 64 QAM | >5 | >4 | >8 | >12 | >16 | >18 | ≤3 |

For PRACH, PUCCH and SRS transmissions, the allowed MPR is according to that specified for PUSCH QPSK modulation for the corresponding transmission bandwidth.

For each subframe, the MPR is evaluated per slot and given by the maximum value taken over the transmission(s) within the slot; the maximum MPR over the two slots is then applied for the entire subframe.

For transmissions with non-contiguous resource allocation in single component carrier, the allowed Maximum Power Reduction (MPR) for the maximum output power in table 6.2.2-1, is specified as follows $$MPR = CEIL\{M_A, 0.5\}$$

Where $M_A$ is defined as follows
MA= 8.00−10.12; 0.00<A≤0.33
   5.67−3.07A; 0.33<A≤0.77
   3.31; 0.77<A≤1.00
Where $$A = N_{RB\_alloc}/N_{RB}.$$

CEIL$\{M_A, 0.5\}$ means rounding upwards to closest 0.5 dB, i.e. MPR ∈ [3.0, 3.5 4.0 4.5 5.0 5.5 6.0 6.5 7.0 7.5 8.0]

For the UE maximum output power modified by MPR, the power limits specified in subclause 6.2.5 apply.

If the UE is configured with TTI of 4-OFDM symbols in uplink and the DMRS in TTI number n is shared with TTI number n+1 then the allowed MPR in both TTI number n and TTI number n+1 shall be derived as follows:

$$MPR = MAX(MPR_n, MPR_{n+1})$$

Where
MPRn and $MPR_{n+1}$ are the values of MPR according to the modulation and transmit bandwidth configuration used in TTI number n and TTI number n+1 respectively as defined in Table 6.2.3-1.

Figure 6:
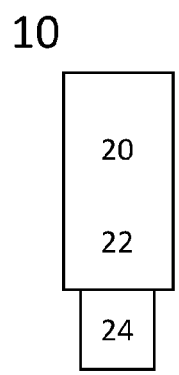
FIG. 6, showing an exemplary user equipment.

FIG. 6 schematically shows a terminal 10, which may be implemented in this 1020 example as a user equipment. Terminal 10 comprises control circuitry 20, which may comprise a controller connected to a memory. Any module of the terminal, e.g. receiving module and/or transmitting module and/or decoding module, may be implemented in and/or executable by the terminal, in particular the control circuitry 20, in particular as module in the controller. Terminal 10 also comprises radio circuitry 22 providing receiving and transmitting or transceiving functionality, the radio circuitry 22 (operably, e.g. to be controlled by the control circuitry) connected or connectable to the control circuitry. An antenna circuitry 24 of the terminal 10 is connected or connectable to the radio circuitry 22 to receive or collect or send and/or amplify signals. Radio circuitry 22 and the control circuitry 20 controlling it may be adapted for transmitting signaling. The terminal 10 may be adapted to carry out any of the methods for operating a terminal disclosed herein; in particular, it may comprise corresponding circuitry, e.g. control circuitry.

Figure 7:
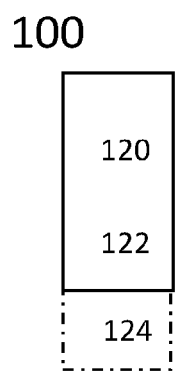
FIG. 7, showing an exemplary network node.

FIG. 7 shows an exemplary radio node 100, which may be implemented as a network node. Radio node 100 comprises control circuitry 120, which may comprise a controller connected to a memory. Any module, e.g. receiving module and/or transmitting module and/or configuring module (e.g., for configuring a terminal) of the radio node may be implemented in and/or executable by the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The radio node 100 may be adapted to carry out any of the methods for operating a radio node or network node disclosed herein; in particular, it may comprise corresponding circuitry, e.g. control circuitry. The antenna circuitry may be connected to and/or comprise an antenna array.

There may be considered a network node adapted for performing any one of the methods for operating a network node described herein.

There may be considered a terminal or user equipment adapted for performing any one of the methods for operating a radio node described herein.

There is also disclosed a program product comprising code executable by control circuitry, the code causing the control circuitry to carry out and/or control any one of the method for operating a radio node as described herein, in particular if executed on control circuitry, which may be control circuitry of a user equipment or a network node.

Moreover, there is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Resources may generally comprise time/frequency resources for communication, and/or associated power and/or codes, e.g. depending on the multiplexing scheme used. References to resources, radio resources and/or time and/or frequency resources (e.g., subframe, slot, symbol or resource block) may refer to such resources structured according to 3GPP standards, in particular LTE and/or NR. It may be considered that decoding may comprise decoding of error detection coding and/or forward error coding. The extracted information may generally be and/or comprise control information, in particular in a scheduling assignment. It may be considered that the extracted information is received on a control channel and/or is based on control channel signaling. Control channel signaling may in particular be signaling on a physical control channel.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device, and/or one or more receivers and/or transmitters and/or transceivers. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS. A terminal may in particular be adapted for V2x communication. A terminal may be adapted for one or more (cellular) Radio Access Technologies (RATs), e.g. LTE and/or UMTS and/or a 5G RAT, e.g. LTE Evolution and/or NR). Generally, a terminal may be any device adapted for wireless communication via D2D and/or one or more cellular RATs. A wireless communication network may comprise two or more terminals communicating via D2D communication, and/or a terminal communicating with a radio access node of a RAN (Radio Access Network) implementing one or more RATs. Such a radio access node may e.g. be an eNodeB. It may generally be considered that a terminal represents a device capable of serving as an end or termination point of a communication. A terminal may be a user equipment or phone or smart phone or computing device or sensor device or machine or vehicular device adapted for wireless communication as described herein. A terminal adapted for D2D communication may in particular adapted for V2x and/or V2V and/or V2P and/or V2I communication. It may be considered that a terminal is mobile. However, there may be envisioned variants in which a terminal is stationary.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate. A radio node may generally be a network node or a terminal and/or user equipment.

An eNodeB (eNB) may be envisioned as an example of a radio node or network node or base station, e.g. according to an LTE standard. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical or physical channel. A channel may comprise and/or be arranged on one or more carriers, in particular a plurality of subcarriers.

A wireless communication network may comprise at least one network node, in particular a network node as described herein. A terminal connected or communicating with a network may be considered to be connected or communicating with at least one network node, in particular any one of the network nodes described herein.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g., around 5 GHz.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, control circuitry may comprise integrated circuitry for processing and/or control, e.g., one or more processors and/or processor cores and/or FPGAs (Field Programmable Gate Array) and/or ASICs (Application Specific Integrated Circuitry). Control circuitry may comprise and/or be connected to and/or be adapted for accessing (e.g., writing to and/or reading from) memory, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g., data pertaining to communication, e.g., configuration/s and/or address data of nodes, etc. Control circuitry may be adapted to control any of the methods described herein and/or to cause such methods to be performed, e.g., by the radio node. Corresponding instructions may be stored in the memory, which may be readable and/or readably connected to the control circuitry. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

Radio circuitry may comprise receiving circuitry (e.g., one or more receivers) and/or transmitting circuitry (e.g., one or more transmitters). Alternatively, or additionally, radio circuitry may comprise transceiving circuitry for transmitting and receiving (e.g., one or more transceivers).

Radio circuitry may generally comprise, for example, a receiver device and/or transmitter device and/or transceiver device.

Antenna circuitry may comprise one or more antennas or antenna elements, which may be arranged in an antenna array. It may be considered that antenna circuitry comprises one or more additional elements and/or is connected or connectable to one or more additional elements, e.g., wiring and/or Configuring a radio node, in particular a user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE.

A carrier may comprise a continuous or discontinuous radio frequency bandwidth and/or frequency distribution, and/or may carry, and/or be utilized or utilizable for transmitting, information and/or signals, in particular communication data. It may be considered that a carrier is defined by and/or referred to and/or indexed according to for example a standard like LTE. A carrier may comprise one or more subcarriers. A set of subcarriers (comprising at least one subcarrier) may be referred to as carrier, e.g., if a common LBT procedure (e.g., measuring the total energy/power for the set) is performed for the set. A channel may comprise at least one carrier. A channel may in particular be a physical channel and/or comprise and/or refer to a frequency range. Accessing a carrier or channel may comprise transmitting on the carrier. If accessing a carrier or channel is allowed, this may indicate that transmission on this carrier is allowed.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

A channel may generally be a logical or physical channel. A channel may comprise and/or be arranged on one or more carriers, in particular a plurality of subcarriers. A control channel may be such a channel. A communication may generally involve transmitting and/or receiving messages, in particular in the form of packet data. A message or packet may comprise control and/or configuration data and/or payload data and/or represent and/or comprise a batch of physical layer transmissions. Control and/or configuration information or data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Generally, a message may comprise one or more signals and/or symbols.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

A communication link may comprise, and/or be based on, and/or represent, and/or be associated to, one or more channels and/or frequencies and/or frequency bands and/or carriers (representing, e.g., a frequency and/or frequency band) for transmission and/or reception, e.g. of signals and/or data. It may be considered that a communication link is a wireless link and/or pertains to an air interface and/or is based on electromagnetic radiation, in particular radio transmission (and/or microwave transmission), e.g. on the frequencies and/or carriers associated to the link. Generally, a communication link may be between two devices, e.g. two terminals (e.g., in a D2D/sidelink communication link) or between a terminal and a network node, e.g. comprising uplink and downlink carriers.

D2D communication (sidelink communication) may comprise transmission and/or reception of data. It may be considered that D2D communication may generally comprise and/or be defined by data being transmitted from one terminal, e.g. the transmitter or transmitter terminal, (in particular directly) to another terminal, e.g. the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

A licensed band or spectrum may be a part of the frequency spectrum that is and/or has to be licensed for use, e.g. by a telecommunications operator. An unlicensed band or spectrum may be a part of the frequency spectrum that is available without such license. WLAN/WiFi usually uses such unlicensed bands. The requirements for using licensed bands are usually quite different from unlicensed bands, e.g. due to licensed bands being controlled by one operator, whereas unlicensed bands usually are not subject to a centralized operator. Thus, LBT procedures are usually required for unlicensed bands, which may be adapted to facilitate fair distribution of access to the unlicensed spectrum.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

The invention claimed is:

1. A user equipment for a radio access network, the user equipment comprising:
   radio circuitry; and
   control circuitry operatively coupled to the radio circuitry and configured to control the radio circuitry to transmit signaling based on an emission control parameter, the emission control parameter being based on a transmission time interval (TTI) configuration and/or structure.

2. The user equipment of claim 1, wherein the emission control parameter depends on whether a first TTI and a second TTI used by the user equipment overlap in time.

3. The user equipment of claim 1, wherein the emission control parameter is a maximum power reduction (MPR) parameter or an additional maximum power reduction (A-MPR) parameter.

4. The user equipment of claim 1, wherein the first and second TTIs overlap in time and pertain to a same uplink or sidelink.

5. A network node for a radio access network, the network node comprising:
   radio circuitry; and
   control circuitry operatively coupled to the radio circuitry and configured to control the radio circuitry to receive signaling from a user equipment (UE) based on an emission control parameter, the emission control parameter being based on a transmission time interval (TTI) configuration and/or TTI structure pertaining to the UE.

6. The network node of claim 5, wherein the emission control parameter depends on whether a first TTI and a second TTI used by the UE overlap in time.

7. The network node of claim 5, wherein the emission control parameter is a maximum power reduction (MPR) parameter or an additional maximum power reduction (A-MPR) parameter.

8. The network node of claim 5, wherein the first and second TTIs overlap in time and pertain to a same uplink or sidelink.

* * * * *